US009027677B2

(12) United States Patent
Graner et al.

(10) Patent No.: US 9,027,677 B2
(45) Date of Patent: May 12, 2015

(54) ELECTRIC TRACKLAYING GEAR AND USE THEREOF FOR A SELF-PROPELLED WORKING MACHINE

(71) Applicant: Liebherr-Werk Biberach GmbH, Biberach an der Biss (DE)

(72) Inventors: Klaus Graner, Ahlen (DE); Johann Lis, Riedingen (DE)

(73) Assignee: Liebherr-Components Biberach GmbH, Biberach/Riss (DE)

( * ) Notice: Subject to any disclaimer, the term of this patent is extended or adjusted under 35 U.S.C. 154(b) by 0 days.

(21) Appl. No.: 14/017,639

(22) Filed: Sep. 4, 2013

(65) Prior Publication Data
US 2014/0305719 A1    Oct. 16, 2014

Related U.S. Application Data

(63) Continuation of application No. 13/084,989, filed on Apr. 12, 2011, now Pat. No. 8,550,194.

(30) Foreign Application Priority Data

Apr. 12, 2010 (DE) .......................... 10 2010 014 650

(51) Int. Cl.
*B62D 55/088* (2006.01)
*B60K 7/00* (2006.01)
(Continued)

(52) U.S. Cl.
CPC ............ *B62D 55/088* (2013.01); *B60K 7/0007* (2013.01); *B60K 17/043* (2013.01); *B60K 2007/0038* (2013.01);
(Continued)

(58) Field of Classification Search
CPC .... B62D 55/088; B62D 55/06; B62D 55/125; B60K 17/043; B60K 7/0007; B60K 2007/0038; B60K 2007/0092; H02K 9/19; Y02T 10/7258
USPC ............ 180/9.62, 9.1, 372, 65.5; 475/5, 338, 475/317; 290/65.6
See application file for complete search history.

(56) References Cited

U.S. PATENT DOCUMENTS 2,634,589 A * 4/1953 Wilson et al. .................... 62/237
2,855,059 A * 10/1958 Sutherland ................... 180/9.62
(Continued)

FOREIGN PATENT DOCUMENTS

| DE | 19805679 | 8/1999 |
|----|----------|--------|
| EP | 1559604 | 8/2005 |
| WO | 2005021311 | 3/2005 |

*Primary Examiner* — Joseph Rocca
*Assistant Examiner* — Jacob Knutson
(74) *Attorney, Agent, or Firm* — Dilworth & Barrese, LLP

(57) ABSTRACT

The present invention relates to an electric tracklaying gear and the use thereof for a self-propelled working machine, preferably for a construction or earth-moving machine or a surface mining machine such as Surface Miner, which includes an endlessly circulating track chain which can be driven by a crawler drive that is arranged inside the path of circulation of the track chain. It is proposed to associate a cooling device with a closed fluid cooling circuit to the electric motor of the crawler drive arranged in the interior of the path of circulation of the track chain. Due to the high thermal capacity of a suitable cooling fluid such as oil or water-glycol mixture small volumetric flow rates in the fluid cooling circuit and hence small conduit cross-sections are sufficient. On the other hand, due to the closed formation of the fluid cooling circuit any dust input into the crawler drive and also any generation of dust by exhaust air can be avoided.

12 Claims, 4 Drawing Sheets

(51) Int. Cl.
*B60K 17/04* (2006.01)
*B62D 55/06* (2006.01)
*B62D 55/125* (2006.01)
*H02K 9/19* (2006.01)

(52) U.S. Cl.
CPC ........ *B60K 2007/0092* (2013.01); *B62D 55/06* (2013.01); *B62D 55/125* (2013.01); *H02K 9/19* (2013.01); *Y02T 10/7258* (2013.01)

(56) References Cited

U.S. PATENT DOCUMENTS

| | | | |
|---|---|---|---|
| 5,382,854 | A | 1/1995 | Kawamoto et al. |
| 5,842,532 | A * | 12/1998 | Fox et al. ............. 180/6.48 |
| 6,367,571 | B1 | 4/2002 | Schwartz |
| 7,025,158 | B2 * | 4/2006 | Kanzler et al. ....... 180/65.245 |
| 2005/0206250 | A1 * | 9/2005 | Steffen et al. ............. 310/59 |

* cited by examiner

ELECTRIC TRACKLAYING GEAR AND USE THEREOF FOR A SELF-PROPELLED WORKING MACHINE

CROSS REFERENCE TO RELATED APPLICATIONS

The present application is a continuation of U.S. application Ser. No. 13/084,989 filed Apr. 12, 2011, to which priority is claimed.

The present invention relates to an electric tracklaying gear and the use thereof for a self-propelled working machine, preferably for a construction or earth-moving machine or a surface mining machine such as Surface Miner, which includes an endlessly circulating track chain which can be driven by a crawler drive that is arranged within the path of circulation of the track chain.

BACKGROUND OF THE INVENTION

Such tracklaying gears are used for various machines of the type mentioned above such as hydraulic or cable excavators, mobile crawler cranes, bulldozers, asphalt milling machines or Surface Miners. The endlessly circulating track chain traditionally is a link chain made of a metallic material, but it can also mean a rubber chain or a similarly constructed moving belt which circulates endlessly.

To protect the crawler drive against external damages and not increase the track width of the vehicle beyond the outer sides of the link chains, the crawler drive for driving the link chain is integrated into the tracklaying gear, in particular such that the crawler drive is arranged within the path of circulation of the track chain, so that no or at least no significant protrusion does exist. However, this results in various problems.

On the one hand, the drive unit must have a very short overall length, so as not to laterally protrude beyond the track chain. The available installation space substantially is defined by the width of the track chain, so that longer motors with transmission units connected thereto often are too long or could only be mounted with a lateral protrusion.

On the other hand, cooling the drive units often is not possible to a sufficient extent, since a surface cooling or open-circuit cooling is not expedient for reasons of dust input. In addition, the crawler drive in use can also partly be submerged in water, so that a closed design of the drive units must be provided. In the case of forced ventilations, in addition, a strong generation and agitation of dust can be caused by a large stream of air emerging from the drive unit depending on the soil at the site of use, which is not acceptable in most uses.

Due to their short overall length and easy coolability, hydrostatic motors therefore are often used as crawler drive, which drive the tumbler of the tracklaying gear via a planetary transmission and are provided with a hydraulically ventilated multi-disc brake. Due to the small overall length of such hydrostatic motors, it mostly is possible to keep the axial overall length of motor and transmission so short that the entire drive unit can completely be accommodated in the region of the chain width and thus can be well protected against external influences and damages for example by stones.

In addition it has already been considered to use electric motors instead of such hydrostatic drives as crawler drive. However, this is not easily possible for the above-mentioned reasons and problems.

Usually, electric motors are cooled by surface cooling or open-circuit cooling with forced ventilation or self-ventilation. These known cooling solutions are, however, not expedient for use in tracklaying gears of construction machines, surface milling cutters, asphalt milling machines, excavators or the like for reasons of dust input which can be produced by a tracklaying gear operating in or on the soil. In addition, in use the drive might also partly be submerged in water, so that a closed design of the motor is preferred. On the other hand, a strong generation and agitation of dust can be caused by a large stream of air emerging from the motor depending on the soil at the site of use, which is not acceptable in most uses.

In so far, it has already been considered to provide for sucking in cooling air via a kind of snorkel at a higher point of the machine, since less dust is generated there and hence a reduced dust input into the motor is achieved. However, this does not solve the problem of the generation of dust by the emerging cooling air.

The generation of dust can largely be avoided with a hermetically closed motor in which the emerging cooling air is contained in a conduit and recirculated to an outlet at an elevated point on top of the machine. Nevertheless, a rest of dust input into the motor will remain, since the intake conduit cannot be designed arbitrarily high.

Therefore, it has already been considered to employ a hermetically closed motor, in which the air is guided in a closed air circuit and is cooled by means of a heat exchanger with an air inlet and outlet located at the top. However, this involves the problem that the required large amounts of air require very large conduit cross-sections down into the tracklaying gear and back, which in terms of space can hardly be accommodated and can only be protected against mechanical damages with corresponding difficulties.

SUMMARY OF THE INVENTION

Therefore, it is the object underlying the present invention to create an improved electrically driven tracklaying gear for self-propelled working machines of the type mentioned above, which avoids the disadvantages of the prior art and develops the latter in an advantageous way. In particular a reduction of the thermal bad of the crawler drive should be achieved, without paying for this with an increased dust load.

In accordance with the invention, this object is solved by a tracklaying gear described herein. Preferred aspects of the invention are subject-matter of the description herein.

Hence, it is proposed to associate a cooling device with a closed fluid cooling circuit to the electric motor of the crawler drive arranged in the interior of the path of circulation of the track chain. Due to the high thermal capacity of a suitable cooling fluid such as oil or water-glycol mixture small volumetric flow rates in the fluid cooling circuit and hence small conduit cross-sections are sufficient. On the other hand, due to the closed formation of the fluid cooling circuit any dust input into the crawler drive and also any generation of dust by exhaust air can be avoided.

In particular, in accordance with a development of the invention, the electric motor of the crawler drive can be formed as synchronous motor with a permanent-magnet rotor. As a result, the electric motor requires no or almost no rotor cooling. In the case of such a permanent-magnet synchronous motor, which has no rods, but permanent magnets in the rotor, there are almost no rotor losses, so that no intensive rotor cooling is necessary.

In particular, the electric motor can be formed without fan axially outside the end shields. Since the rotor requires no special rotor cooling, separate fan units, which are arranged outside the end shields and hence would greatly increase the overall length, can be omitted. As a result, the drive unit can be constructed so short that it can completely or almost completely be arranged within the width of the track chain.

To be able to also maintain a short overall length for the transmission, without having to omit a possibly necessary large gear ratio, a preferably multi-stage planetary transmission can be connected with the electric motor in an advantageous way. To achieve a compact connection to the track chain of the tracklaying gear, it is provided in an advantageous development of the invention that the ring gear of said planetary transmission serves as transmission output wheel. In particular, the planetary transmission can include an integrated tumbler bearing and/or a ring gear connected with the tumbler of the tracklaying gear.

Advantageously, the electric motor and the transmission connected therewith are arranged on different sides of the tumbler, so that the space on both sides of the tumbler within the path of circulation of the track chain can be utilized for accommodating the drive unit. In particular, the drive unit comprising the electric motor and the transmission connected therewith can be accommodated in the tumbler, so that the tumbler extends around the drive unit comprising electric motor and transmission.

To compensate length differences of electric motor and transmission, the tumbler of the tracklaying gear can be provided with a crank such that on at least one side the electric motor/transmission unit does not protrude beyond the track chain. If the total length of the electric motor/transmission unit is shorter than or equal to the track chain width, the tumbler crank can be designed such that the electric motor/transmission unit at least approximately is arranged centrally with respect to the track chain width. However, if a protrusion beyond the track chain width cannot be avoided completely, the tumbler crank can be dimensioned such that on at least one side no protrusion occurs. Depending on the installation conditions, the tumbler crank can be formed such that the electric motor protrudes, or also such that the transmission protrudes. Advantageously, the tumbler crank can be formed such that the protrusion, if not avoidable, occurs on an inside of the track and the electric motor/transmission unit does not protrude beyond the entire width of the tracklaying gears.

Advantageously, the electric motor and the transmission form a modular construction unit which is formed to be pulled out of the tumbler and be pushed into the tumbler as a whole. In this way, an easy assembly and an easy adaptation of the required drive power to the respective tracklaying gear can be achieved. Advantageously, the tumbler and said construction unit comprising electric motor and transmission are formed such that the electric motor and the transmission can be pulled out of the tumbler or be inserted into the same in axial direction approximately parallel to the axis of rotation of the tumbler.

Alternatively or in addition it is provided in accordance with a development of the invention that the electric motor forms an assembly detachable from the transmission, so that the electric motor can also be demounted separately without removing the transmission, with the transmission attached to the tumbler. In particular, the electric motor and the transmission can be formed such that the electric motor can be pulled off in axial direction approximately parallel to the axis of rotation of the tumbler towards the side of the tumbler facing the transmission. In this way, maintenance is simplified considerably.

In an advantageous development of the invention, auxiliary units connected with the crawler drive, additional assemblies or control components can directly be arranged on the shaft end of the electric motor facing away from the transmission unit.

In an advantageous development of the invention a brake can be arranged at said shaft end of the electric motor, which advantageously acts on the drive shaft of the electric motor and in so far utilizes the gear ratio of the transmission connected to the electric motor also for the braking effect, so that a smaller-size brake can be used. At the same time, the brake becomes easily accessible and therefore easy to maintain. If further add-on components are provided at the same time, the brake can be seated between such further add-on components and the electric motor in accordance with an advantageous development of the invention, wherein advantageously both the brake and the further add-on components are arranged coaxially to the drive shaft of the electric motor.

Alternatively or in addition, a rotary encoder can also be arranged on said shaft end of the electric motor, which is part of the power and/or control electronics which in particular can include a frequency converter, in order to actuate the electric motor. Especially with the hard uses and great loads of a tracklaying gear, the accommodation of the brake and the rotary encoder allows a good access for maintenance and repair.

The heat dissipation from the cooling fluid in principle can be effected in different ways. In a preferred development of the invention, the fluid cooling circuit possesses a heat exchanger arranged outside the tracklaying gear for cooling the cooling fluid, which via cooling fluid conduits guided out of the tracklaying gear on the end face, which preferably can extend on or in the supporting frame of the tracklaying gear, is connected with a portion of the fluid cooling circuit associated to the electric motor. In principle, said heat exchanger might be arranged outside the motor housing, in order to dissipate the heat from the cooling fluid to the surroundings. Advantageously, said heat exchanger can be arranged on the machine at a point distinctly above the tracklaying gear, in order to avoid clogging of the heat exchanger by dust. In principle, various positions are possible for the placement of the heat exchanger.

In principle, the cooling fluid of the fluid cooling circuit can be circulated within the electric motor in different ways. In accordance with a development of the invention, for example, a jacket cooling of the stator sheet or a direct cooling of the stator winding can be provided for example with a separating cylinder for the rotor. The cooling fluid can also be guided through a cylindrical fluid chamber formed by the housing or through a tube coil which can be cast into the housing or be incorporated in the laminated stator core.

Advantageously, the cooling device for the electric motor also provides a cooling of the winding heads. In particular, the cooling device can include a closed cooling air circuit with forced circulation in the interior of the sealed motor housing, wherein the aforementioned fluid cooling circuit includes a heat exchanger passed over by the cooling air of the closed cooling air circuit for cooling the cooling air. In particular, said cooling air can also be guided over the winding heads, in order to cool the same. Heat is then removed from the cooling air by heat exchange with the fluid cooling circuit, which in turn dissipates the heat to the surroundings.

Said forced circulation of the cooling air in the interior of the motor housing advantageously can be effected by at least one fan wheel which can be seated on the motor shaft, in order to rotate with the same. Advantageously, two such fan wheels can be seated on the rotor shaft on opposite sides of the rotor.

In accordance with a development of the invention, the closed cooling air circuit in the interior of the sealed motor housing is selectively guided over the winding heads. For this purpose, air duct and/or guiding means can be provided in the respective winding head space, in order to guide the cooling air through the winding heads and over cooling tube coils of the fluid cooling circuit which are exposed in the winding head spaces. By cooling down the circulating internal air directly in or at the winding head space, an efficient cooling of the winding heads can be achieved, without sacrificing a compact construction. Embedding the cooling tube coils of the fluid cooling circuit into the winding head is not required.

In principle, the cooling tube coils can be arranged at different points in the winding head, wherein they are advantageously positioned in a portion with strong cooling air circulation. In accordance with an advantageous embodiment of the invention, the cooling tube coils can be arranged at the end faces of the winding heads, in this way, a high heat transfer from the cooling air into the cooling tube coils can be achieved while at the same time having a compact construction.

In principle, said cooling air duct and/or guiding means can be formed in different ways. In accordance with a development of the invention they are designed such that the cooling air passes through the winding head at the neck of the winding head, i.e. at the transition between winding head and stator sheets, and circulates around the winding head, wherein the air stream passing through the winding head flows through between the outside of the winding head and the housing, around the end face of the winding head onto the inside of the winding head or vice versa around the winding head.

In particular, the air duct and/or guiding means can comprise preferably slot-shaped passage recesses in the winding head, which are arranged at the neck of the winding head and are distributed over the circumference of the winding head. These passage recesses in the winding head can be achieved by various means which keep the winding strands at the neck of the winding head apart or spread them apart. For example, sleeve-shaped spreading elements might be provided between the strand bundles emerging from the stator sheets. In accordance with a development of the invention other separating means preferably in the form of loops or tapes can also be provided, which bundle the winding strands and keep the desired slot-shaped passage recesses free.

In accordance with a development of the invention, the air duct and/or guiding means for the cooling air define a plurality of flow paths annularly extending around the winding heads, which through said passage recesses each annularly extend around a respective segment of the winding head in which a respective passage recess is formed. Said flow paths each extend radially through a passage recess, then axially between the winding head and the machine housing along the winding head, then radially around an end-face winding head portion and axially back to the passage recess on an inside of the winding head, wherein the flow direction possibly can also be oriented the other way round.

BRIEF DESCRIPTION OF THE DRAWINGS

The invention will subsequently be explained in detail with reference to preferred embodiments and associated drawings, in which.

DESCRIPTION OF THE PREFERRED EMBODIMENTS

Figure 1:
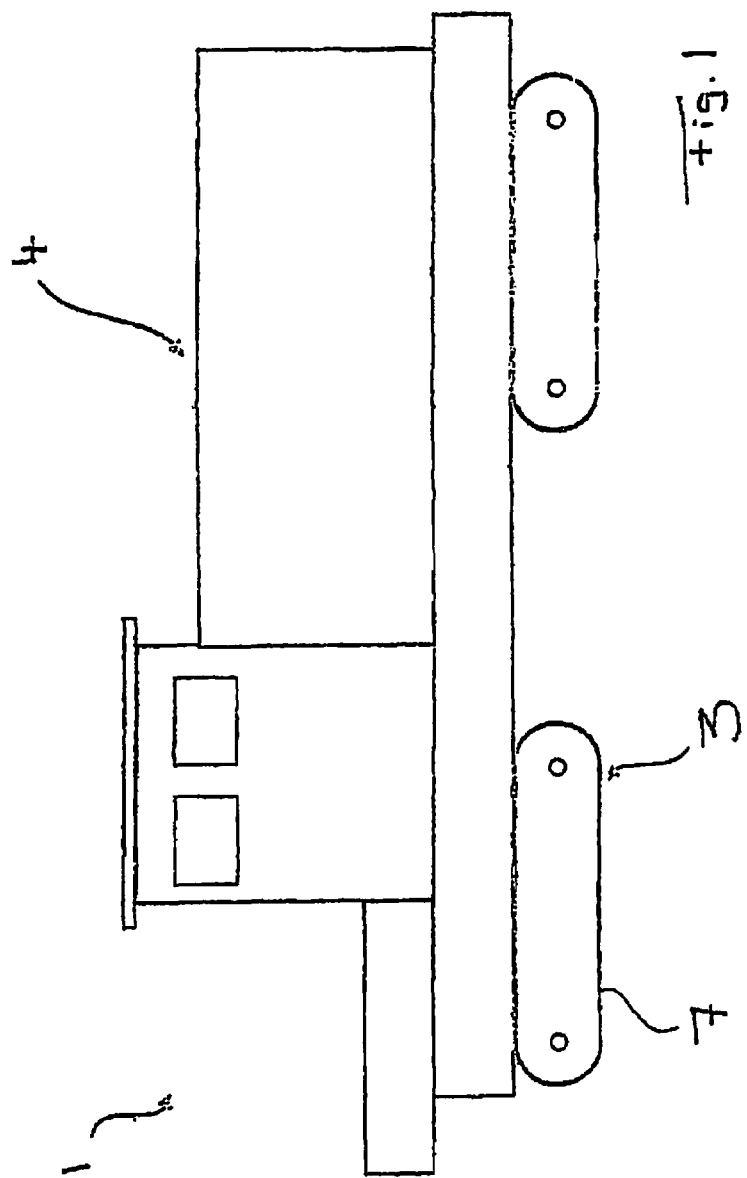
FIG. 1: shows a schematic representation of a self-propelled working machine with an electrically driven tracklaying gear according to an advantageous embodiment of the invention.

FIG. 1 shows a self-propelled working machine which can be moved by means of electrically driven tracklaying gears 3. The self-propelled working machine comprises the machine body 4 which is movably supported on the ground by said tracklaying gears 3.

Figure 2:
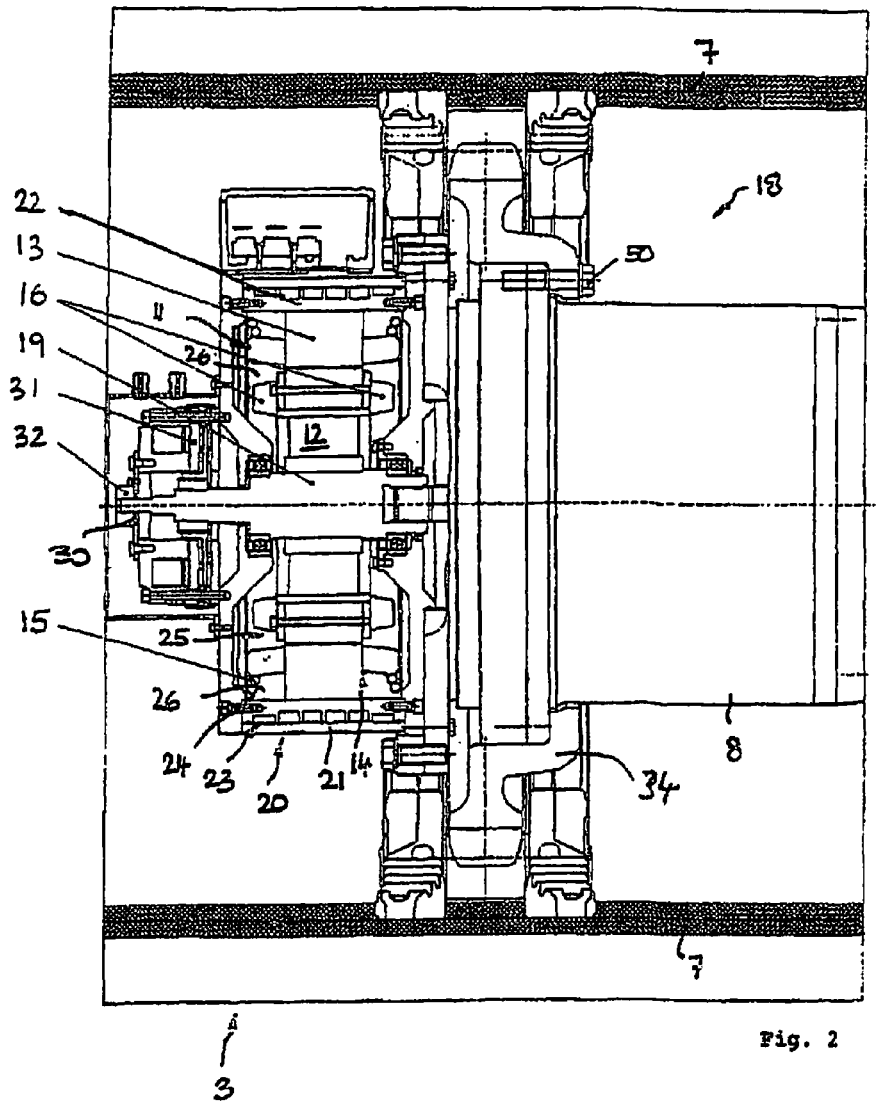
FIG. 2: shows a schematic sectional view of the electric crawler drive of the tracklaying gear of FIG. 1, which shows the electric motor in the form of a permanent-magnet-excited synchronous motor with spring-loaded brake and rotary encoder and the planetary transmission connected thereto as well as its connection to the tumbler of the tracklaying gear.

As shown in FIGS. 1 and 2, the tracklaying gear 3 in a manner known per se comprises a circulating track chain 7 which as a link chain for example can be made of a metallic material and can be deflected or supported via a plurality of deflection and support wheels and can be driven by at least one drive wheel 34 and at least one crawler drive connected therewith, as will be explained below.

As shown in FIG. 2, the crawler drive 18 comprises an electric motor 20 whose motor shaft 19 is connected with a transmission 8 in the form of a planetary transmission.

Said electric motor 20 advantageously is formed in the form of a synchronous motor with permanent-magnet rotor 12, which in the rotor has no rods, but permanent magnets.

Said rotor 12 is rotatably mounted on end shields which form part of a machine housing 21 and/or close the end face of a jacket 22, which surrounds the stator 13 of the electric motor 20.

Said jacket 22 includes a jacket cooling through which cooling fluid of a fluid cooling circuit 23 is circulated. Said jacket is seated on the stator sheets without leaving a gap, flush and/or flat, in order to achieve a good transfer of heat from the stator 13 into the cooling jacket.

Beside said fluid cooling circuit 23 the cooling device 24 of the electric machine 20 comprises an air cooling 25 for cooling the winding heads 11 which on both sides of the stator 13 and of the rotor 12 protrude into the winding head spaces 26 defined by the housing 21, more exactly by the jacket 22 and the end shields. As shown in FIG. 2, the stator 13 comprises a winding 14 which is partly embedded in the stator sheet of the stator 13 and outside said stator sheet forms basket-like winding heads 11 from both sides.

To cool said winding heads 11, an internal cooling air circulation is effected by means of fan wheels 16 in each of said winding head spaces 26, i.e. no ambient air is passed through the machine or guided over the winding heads 11, but an internal cooling air circuit is generated, which cools said winding heads 11. To withdraw heat from the cooling air, cooling tube coils 15 are provided in the winding head spaces 26, as shown in FIG. 2, through which the cooling fluid is circulated. The fluid cooling circuit guided through said cooling tube coils 15 in principle can be formed separate from the fluid cooling circuit 23 of the jacket cooling 22. Advantageously, however, a coupling of the cooling tube coils 15 to the fluid cooling circuit 23 of the jacket cooling can be provided, wherein depending on the thermal load of the individual machine parts a parallel coupling or also a serial coupling of the cooling tube coils 15 to the jacket cooling and to the fluid cooling circuit 23 feeding the same can be provided.

To achieve a strong cooling effect on the circulating cooling air, the outside of said cooling tube coils 15 advantageously is provided with a ribbing, for example in the form of a plurality of axial ribs on each cooling tube, in order to increase the heat transfer surface of the cooling tube coils.

As shown in FIG. 2, a brake 31 is provided on the shaft end 30 of the electric motor 20 facing away from the transmission 8, which can be utilized as holding brake. The good accessibility allows a fast repair.

To furthermore easily realize the electric functionality of the tracklaying gear 3 with the permanent-magnet synchronous motor via a frequency converter, a rotary encoder 32 is provided which is mounted on said shaft end 30 after the brake 31. Such accommodation of the brake 31 and the rotary encoder 32 allows a good access for the maintenance and repair especially in hard uses and under great loads.

Figure 3:
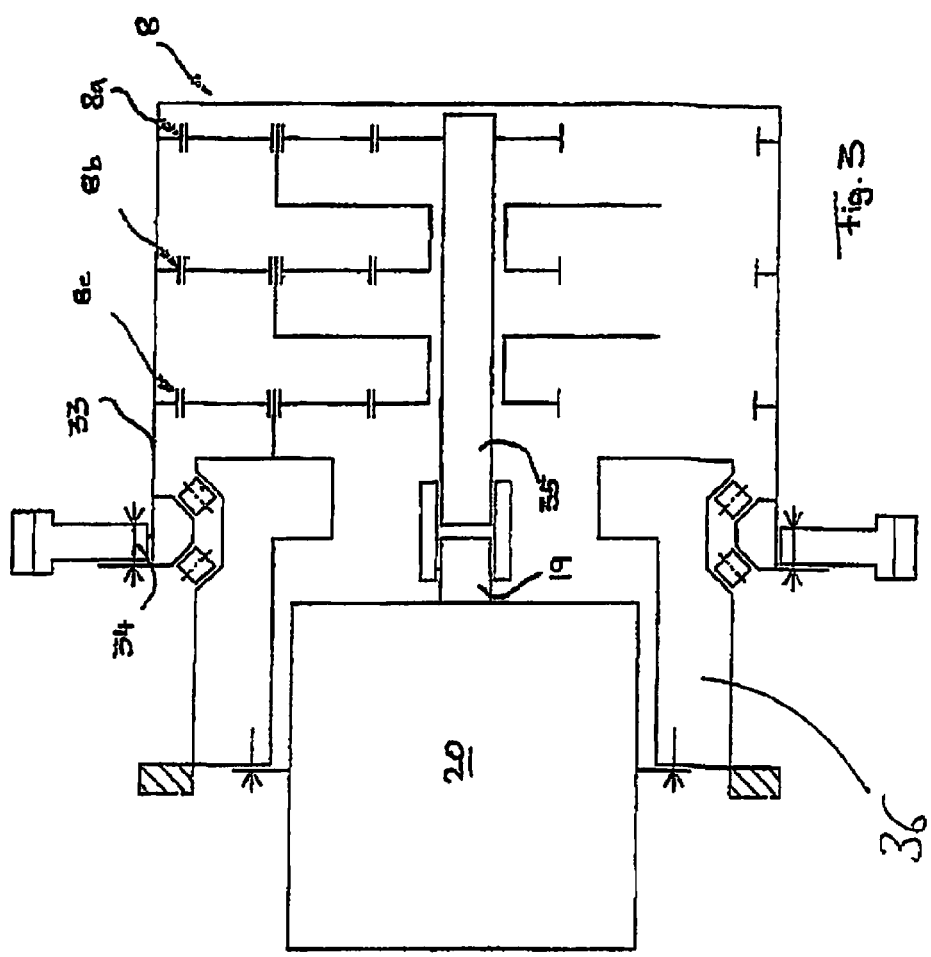
FIG. 3: shows a transmission diagram of the planetary transmission of FIG. 2 with tumbler bearing.

As shown in FIG. 3, the planetary transmission 8 can be of the multistage type and include an integrated tumbler bearing. The transmission input shaft 35 coupled with the motor shaft 19, which possibly can be formed by said motor shaft, drives a first planetary gear stage 8a whose output movement is transmitted, via the planet carrier to the second planetary gear stage 8b, whose output movement in turn is transmitted to the third planetary gear stage 8c. The ring gear 33 of the planetary transmission, which forms the outer transmission housing, is connected with the drive wheel 34 of the tracklaying gear 3 which in the illustrated embodiment is supported on the stationary transmission bell 36 via two tapered or cylindrical roller bearings in O-arrangement.

To axially achieve a central or almost central centering of the crawler drive 18, the tumbler 34 can be provided with a crank, as is shown in FIG. 2. In this way, the crawler drive 18 in particular can be placed such that it is arranged completely within the path of circulation of the track chain 7 and on no side protrudes from the chain width or protrudes a little on only one side and thereby has a low risk of being damaged.

Figure 4:
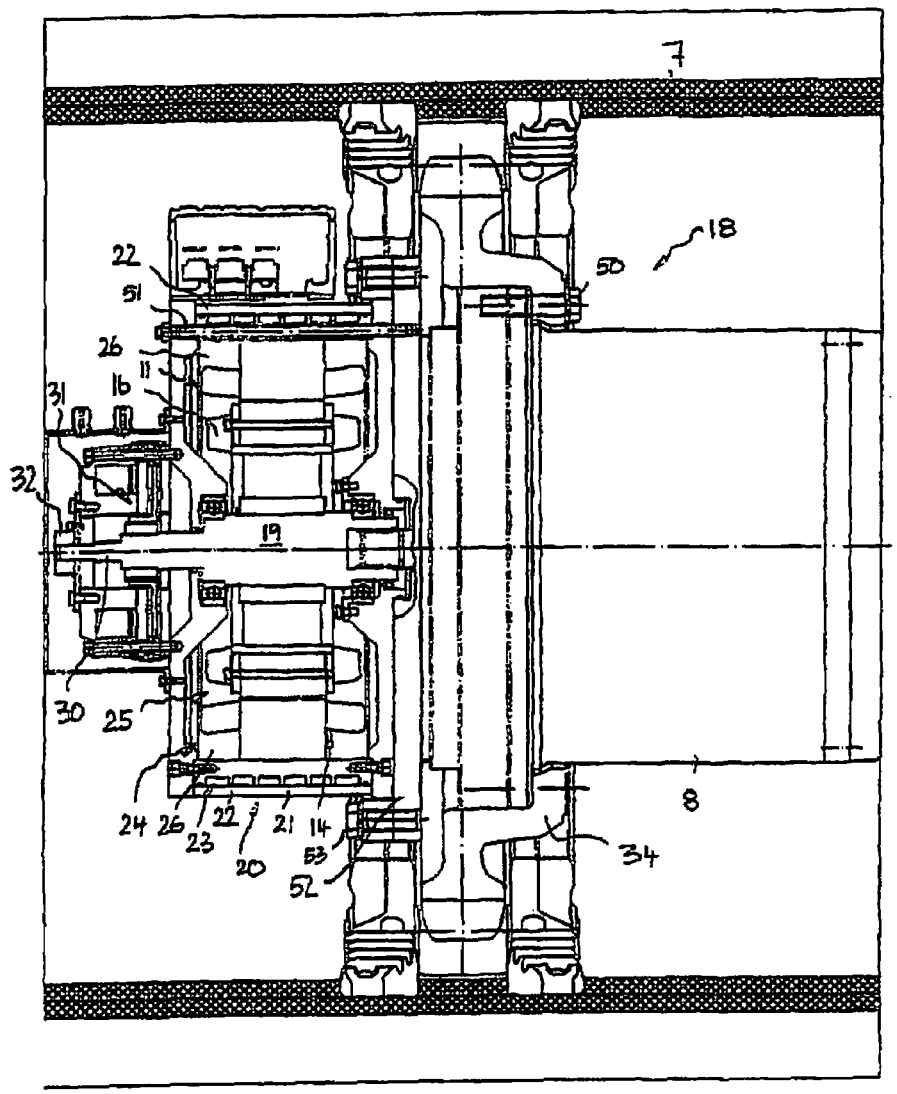
FIG. 4: shows a schematic sectional view of an electric crawler drive according to a further embodiment of the invention in a view similar to FIG. 2, wherein the electric motor is formed as separately demountable assembly.

The embodiment of the tracklaying gear and its electric crawler drive shown in FIG. 4 largely corresponds to the embodiment as shown in FIG. 2, so that the same reference numerals are used for corresponding components and in so far reference is made to the preceding detailed description. The embodiment according to FIG. 4 substantially differs from the embodiment according to FIG. 2 by the modular and separately separable construction of the drive unit and its components electric motor 20 and planetary transmission 8. Similar to the above described embodiment, the planetary transmission 8 comprises an integrated tumbler bearing, so that the transmission 8 is supported on the tumbler 34. In the illustrated embodiment, the tumbler 34 with its cranked portion can be attached to the planetary transmission 8 by fastening bolts 50.

Advantageously, the electric motor 20 forms a construction unit separate from the transmission 8, which can also be demounted without removal of the transmission 8 and/or without opening the track chain 7, i.e. with the transmission 8 attached to the tumbler 34. As shown in FIG. 4, the electric motor 20 is connected with the transmission 8 by fastening means 51, wherein said releasable fastening means 51 can be actuated from the side facing away from the transmission 8. Advantageously, said fastening means 51 can comprise screw bolts which extend through the housing 21 of the electric motor 20, preferably substantially parallel to the longitudinal extension of the motor shaft 19, so that the electric motor 20 can be detached or vice versa be attached from the side facing away from the transmission 8. Said fastening means 51 allow to clamp the housing 21 of the electric motor 20 to a mounting flange 52 extending transverse to the motor shaft 19, which can be attached to a drive carrier via releasable fastening means, preferably in the form of screw bolts 53.

If the aforementioned fastening means 51, which retain the motor at the carrier flange 52, are released, the electric motor 51 can be pulled off axially, without having to remove the transmission 8 and/or open the track chain 7.

The invention claimed is:

1. A tracklaying gear for a self-propelled working machine, which includes an endlessly circulating track chain (7) which is driven by a crawler drive (18) that is arranged within the path of circulation of said track chain (7), wherein the crawler drive (18) includes at least one electric motor (20) with a motor housing (21) sealed in an air- and/or dust-tight manner and to said electric motor (20) a cooling device (24) with a closed fluid cooling circuit (23) is associated, wherein a transmission is connected to the electric motor, said transmission having an output shaft driving a tumbler which is in driving engagement with the track chain, wherein the electric motor and the transmission are positioned on opposite sides of said tumbler, wherein said tumbler is provided with a crank such the crawler drive including the electric motor and the transmission are arranged within the track chain width substantially without protrusion beyond the sides of the track chain.

2. The tracklaying gear according to the claim 1, wherein the electric motor (20) of the crawler drive (18) is formed as synchronous motor with permanent-magnet rotor (12).

3. The tracklaying gear according to claim 1, wherein the rotor (12) of the electric motor (20) is formed free from cooling ducts.

4. The tracklaying gear according to claim 1, wherein the electric motor (20) and the transmission connected therewith are formed as modular construction unit which can be pulled out of the tumbler or be pushed into the tumbler as a whole.

5. The tracklaying gear according to claim 1, wherein the electric motor (20) forms an assembly detachable from the transmission and with the transmission mounted at the tumbler is formed to be demountable and detachable from the transmission separately and without removing the transmission and without opening the track chain (7).

6. The tracklaying gear according to claim 1, wherein the electric motor (20) is completely arranged within the track chain width with the transmission connected therewith.

7. The tracklaying gear according to claim 1, wherein the transmission is a multi-stage planetary transmission whose ring gear (33) serves as transmission output wheel.

8. The tracklaying gear according to claim 1, wherein a brake (31) is arranged on a shaft end (30) of the electric motor (20) facing away from the transmission.

9. The tracklaying gear according to claim 8, wherein the brake (31) is formed as spring-loaded brake with electromagnetic ventilation, 10. The tracklaying gear according to claim 1, wherein the cooling device (24) in the interior of the sealed motor housing (21) includes a closed cooling air circuit (25) with forced circulation and the fluid cooling circuit (23) includes a heat exchanger, preferably in the form of cooling tube coils (15), passed over by the cooling air of the closed cooling air circuit (25), for cooling the cooling air.

11. The tracklaying gear according to claim 10, wherein for the forced circulation of the cooling air in the interior of the motor housing, at least one fan wheel (16) seated on the motor shaft (19) is provided.

12. Use of a tracklaying gear according to claim 1, in a surface milling cutter, in an asphalt milling cutter or in a snow blower.

* * * * *